March 13, 1951

G. A. BRETTELL, JR., ET AL 2,545,191

ELECTRONIC DEVIATION INDICATOR FOR
ECHO RANGING TRAINING APPARATUS

Filed March 12, 1945

Inventors
GEORGE A. BRETTELL JR.
CLARK F. BRADLEY

By Ralph L Chappell
Attorney

BEARING OF SIMULATED TARGET

BEARING OF SIMULATED TRANSDUCER

GEORGE A. BRETTELL JR.
CLARK F. BRADLEY

GEORGE A. BRETTELL JR.
CLARK F. BRADLEY

Patented Mar. 13, 1951

2,545,191

UNITED STATES PATENT OFFICE 2,545,191

ELECTRONIC DEVIATION INDICATOR FOR ECHO RANGING TRAINING APPARATUS

George A. Brettell, Jr., and Clark F. Bradley, San Diego, Calif., assignors to the United States of America as represented by the Secretary of the Navy Application March 12, 1945, Serial No. 582,352

4 Claims. (Cl. 35—10.4)

The present invention relates to electronic indicator systems, and particularly to such systems for indicating both the direction and magnitude of the departure of a given physical quantity or effect from a desideratum.

One useful embodiment of the invention consists of the device described herein for use with training devices on which operators of underwater sound equipment are taught procedures for detecting and locating submarines and for following their maneuvers.

The mechanism used for echo ranging with underwater sound usually includes an underwater transducer that transmits signals into the water and also responds to echoes. This transducer is rotatable on a vertical shaft and has one horizontal direction in which it transmits its strongest signal and from which it receives echoes with its greatest sensitivity. The operator, once he detects an echo from a submerged object, is required accurately to find the bearing from which the echoes come. With one type of equipment the operator must simply hunt with his directional transducer for the bearing that produces the best echo. Another type includes a visual indicator of right and left errors in the facing of the transducer for enabling the operator more quickly to find the right bearing and for helping him follow movements.

The training device shown and described in the application of H. E. Hartig, et al., for Advanced Bearing Teacher, Serial Number 483,620, filed April 19, 1943, provides instruction and practice in the procedures applicable to that kind of echo-ranging equipment with which target bearing must be judged by audible indications alone. The embodiment described herein adapts the device of application No. 483,620 to the teaching of the operating procedures applicable to that kind of underwater echo-ranging that includes a visual indicator of bearing deviation.

In the training device which constitutes the present embodiment, the light spot of a cathode-ray oscilloscope moves slowly across its screen to indicate the elapse of time after the simulated transmission of a sound pulse. The simulated echo causes a lateral deviation of the spot to the right or left to indicate that the supposed origin of the echo is to the right or left respectively of the direction in which the student has his simulated transducer pointed.

Alternatively, the present embodiment of the invention may be used with the device of application No. 483,620 to provide the instructor with a direct, positive and more accurate indication of the student's errors.

The invention, in this and other embodiments, may also be used similarly with other instructional devices and in numerous other applications where it is desirable that indications of sense (right, left, positive, negative, etc.) and magnitude be super-imposed on indications of time or other quantities.

These and other objects and advantages will appear from the following specification and from the drawings in which.

Figure 1:
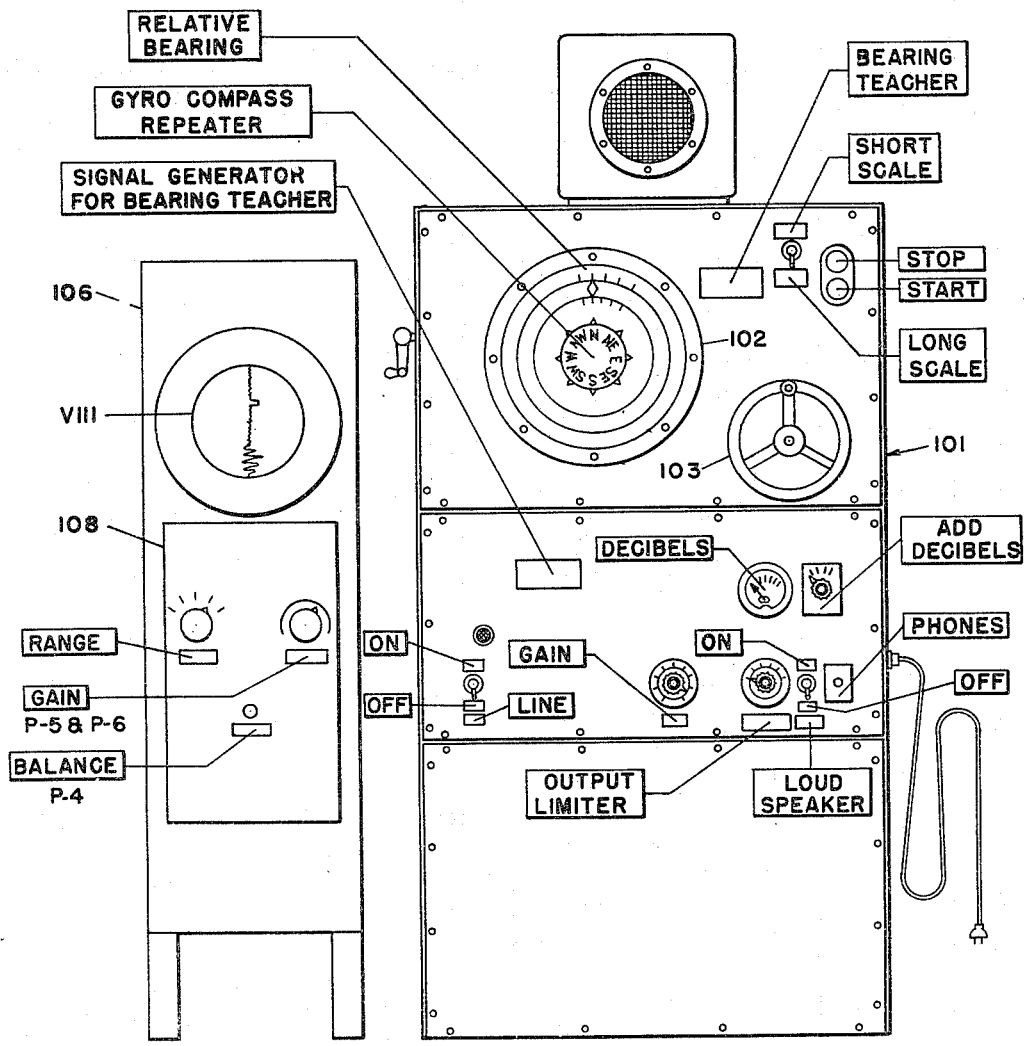
Fig. 1 is an external view of the device of the present invention standing alongside the device of the Hartig application 483,620, for use therewith.

In Fig. 1 the advanced bearing teacher described in the application of H. E. Hartig, et al., Serial Number 483,620 indicated by the reference numeral 101, includes for the use of the student operator a bearing indicator dial 102, a training handle 103 and also various gain and filter controls. The bearing indicator 102 includes a relative bearing scale, a true bearing scale, and a bug which indicates on these two scales the orientation or "bearing" of the supposed underwater transducer.

The device of the present invention, indicated by the reference numeral 106, includes a cathode ray oscilloscope VIII of which only the viewing screen shows in Fig. 1, and includes also a control panel 108, containing a range switch, a gain control P5 and P6, and a balance adjustment P4.

Figure 2:
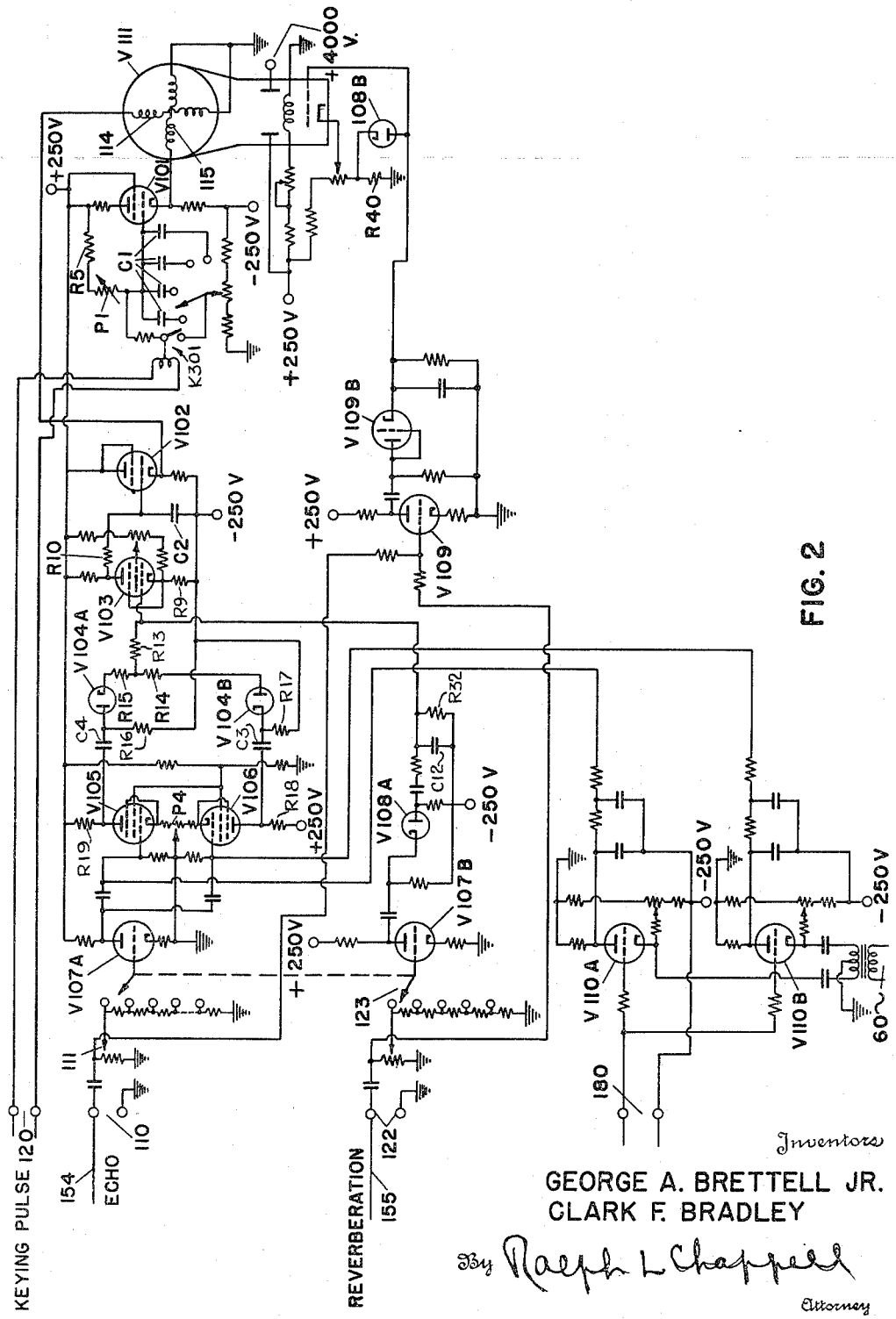
Fig. 2 is a schematic circuit diagram of the device of the present invention.
Figure 5:
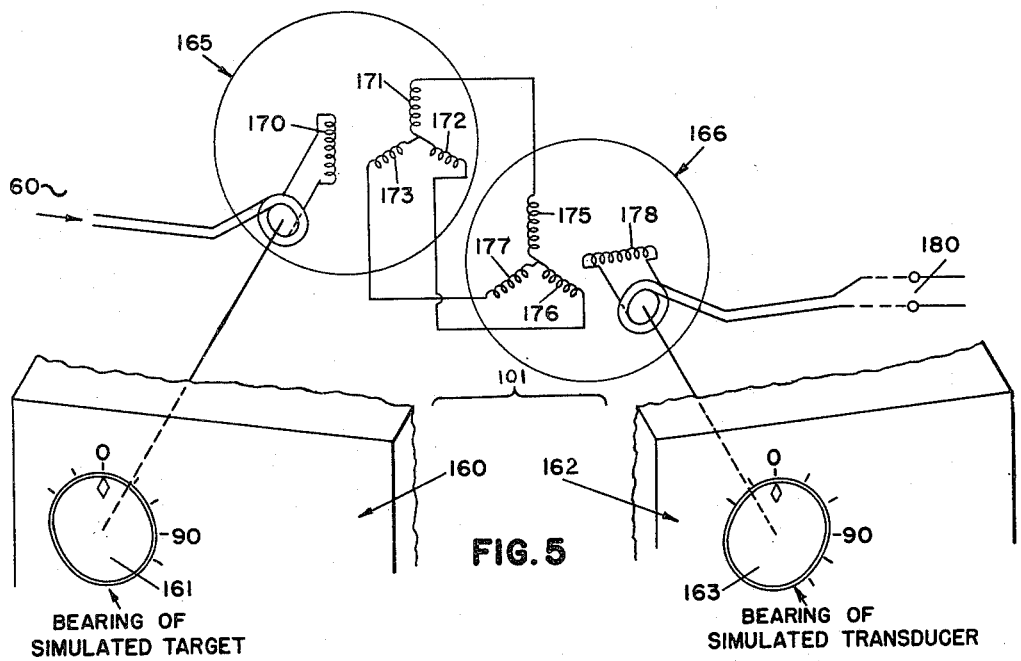
Fig. 5 is a diagram of a bearing control adapter for use in operating the device in Fig. 2 from the machine of the Hartig application.

Fig. 2 shows the circuits of a deviation indicator itself. As has already been pointed out, while this device is useful with the Hartig machine shown with it in Fig. 1, it is applicable to other uses as well. Suitable adapters for connecting it to the Hartig machine are shown in Figs. 3, 4 and 5.

Figure 3:
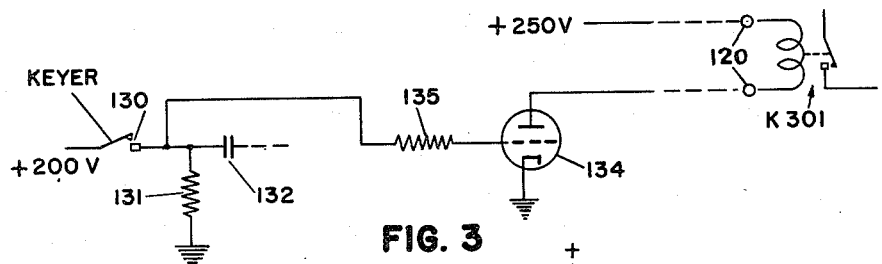
Fig. 3 is a schematic diagram of a keying-control adapter for use in operating the device of Fig. 2 from the machine of the Hartig application.

Fig. 3 illustrates a keying adapter. The Hartig machine includes a pair of contacts 130 for momentarily applying 200 volts across resistor 131 and through condenser 132 to other circuit elements for initiating a reverberation tone. The keying adapter consists simply of a suitable power amplifying tube 134 the control grid of which is connected through a protecting resistor 135 to the load side of switch 130. The plate circuit of adapter tube 134 is carried out to the system of Fig. 2 and connected (as indicated in Fig. 3) to the coil of relay K301. Protective resistor 135 insures that the adapter will draw no appreciable power through the switch 130 to disturb the circuits of the Hartig machine and also insures that the high voltage (200 volts) will not draw an excessive current from the control grid of tube 134. When the contacts 130 close, tube 134 conducts and energizes relay K301. When the contacts 130 open, tube 134 stops conducting and relay 301 opens its contacts.

Figure 4:
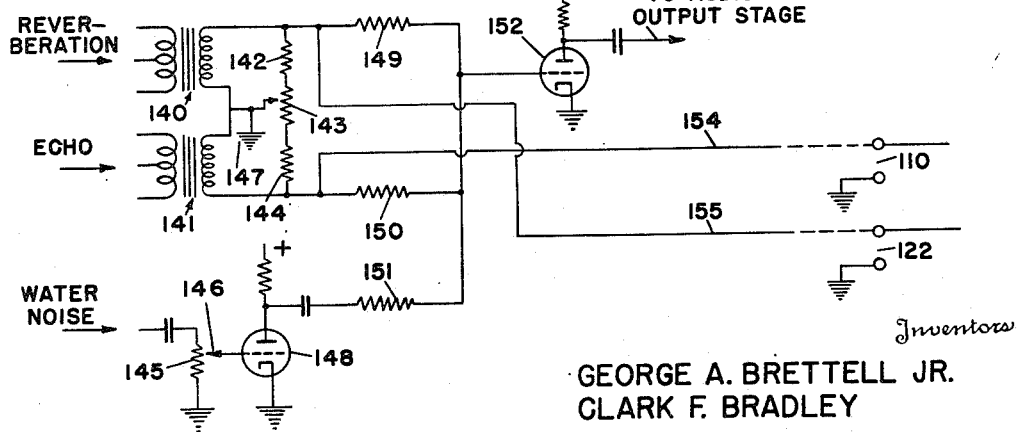
Fig. 4 is a schematic diagram of a signal adapter for use in operating the device of Fig. 2 from the machine of the Hartig application.

Fig. 4 shows the adapter and circuit connections for supplying echo and reverberation signals from the Hartig machine to the device of the present invention. In the Hartig machine the reverberation signal and echo signal come through transformers 140 and 141 respectively, the secondary windings of which are connected in series. This series pair has a shunt consisting of resistors 142, 143 and 144. Resistor 143 is adjustable to permit changing the ratio of the echo and reverberation intensities. Also in the Hartig machine is a resistor 145 whose adjustable tap 146 constitutes the output from the water noise circuit. As shown in the Hartig application these transformers, 140, 141 and the simulated water noise output 146 are all connected directly to an audio output amplifier stage, but for use with the present invention these elements preferably are reconnected as shown in Fig. 4.

The adjustable tap of potentiometer 143, which constitutes a common terminal of the outputs of transformers 140 and 141, is grounded at 147 to obtain independent echo and reverberation voltages with respect to ground. The water noise is put through an additional amplifier stage 148. For providing the audio output to the speaker of the Hartig machine these three signals are fed through high value resistors 149, 150 and 151 to the grid of amplifying stage 152 whence it is transmitted to the audio output stage shown in the Hartig application. To operate the indicator of Fig. 2, echo and reverberation signals are picked off at the transformers 140 and 141 themselves by connections 154 and 155. The high resistances 149, 150 and 151 provide sufficient isolation between the reverberation and echo circuits so that any part of the reverberation signal that appears at the echo terminal 154 will be very small compared to the magnitude of the echo signals themselves and so cannot produce any objectionable deflections of the spot on the cathode ray screen. Amplifier stage 152 makes up the loss in signal strength caused by the isolation resistors, 149, 150 and 151.

Fig. 5 shows diagrammatically the adapter for generating the bearing signal from the Hartig machine. That machine includes on the instructor's side 160 thereof a bearing indicator 161 which shows to the instructor the actual bearing of the simulated target. The student's side 162 of that machine includes a similar bearing indicator 163 which shows the direction in which the transducer is supposedly facing. The machine is so constructed that when these two indicators show the same bearing the machine emits simulated echoes. The adapter consists of a pair of position-transmitting transformers 165 and 166 which are connected to these two bearing indicators 161 and 163 by suitable gears or the like. A transformer of this type is similar in construction to a three phase motor or generator in that it has a three-coil stator winding and a single coil rotor winding. These devices are sold under various trade marks, including "Selsyn" and "Autosyn." As transformers 165 and 166 are used here, the rotor winding of transformer 165 is energized with 60 cycle A. C. from the power line, and the two three-phase stators are connected together. The voltage appearing across the rotor winding of transformer 166 constitutes an output voltage which is impressed on the bearing control terminals of the circuit in Fig. 2.

With the rotor of transformer 165 in the position shown in Fig. 5 rotor winding 170 has maximum coupling with phase 171 of its stator and has couplings somewhat less than maximum (equal to cos 60°) with stator windings 172 and 173. The voltages appearing in these stator windings are transmitted through the electrical connections to corresponding stator windings, 175, 176 and 177, and the currents produced thereby cause a magnetic field to appear which has the same orientation in transformer 166 as does the rotor winding 170 in transformer 165. If now the rotor winding 178 of transformer 166 is oriented to lie across this magnetic field so as to have zero coupling therewith no voltage will be induced in the winding 178. If the rotor 178 is turned slightly out of this zero voltage position it will acquire a slight coupling with the A. C. magnetic field produced by the stator windings so that a voltage will appear at its terminals. Opposite deviations of winding 178 from the zero voltage position produce output voltages of opposite phase with respect to the input voltage applied to rotor winding 170 of transformer 165. The bearing circuit of Fig. 2 distinguishes between right and left deviations by means of this phase relation (in a manner to be described).

Should the rotor 170 of transformer 165 be rotated to the right, say 30°, the magnetic field produced by the three stator windings of transformer 166 would also rotate 30° and require that the rotor 178 be rotated this same 30° to find the new zero voltage position. The action is similar for all rotated positions of rotor 170 but it should be noted incidentally that for each position of rotor 170 there are two positions 180° apart for zero voltage in rotor 178 of transformer 166. But the phase relation between the A. C. voltages in rotors 170 and 178 is the same to the left of one zero and to the right of the other.

The most simple way in which to connect these transformers 165 and 166 mechanically to the bearing indicators in the Hartig machine is to provide one-to-one drive ratios so that the rotor of each transformer turns the same number of degrees as the bearing indicator which drives it. The appearance of the extra no-voltage position of the rotor 178 is immaterial to the Hartig machine because this bearing circuit controls only the echo signal and when the two indicators 161 and 163 are 180° apart no echo signal is produced. In fact, for actual simulation of sea effects the Hartig machine would not produce an echo signal when the bearing of the supposed listening head differed by more than a small angle from that of the supposed target. Consequently, it is feasible to increase the sensitivity of the deviation-indication by gearing up the transformers 165 and 166 so that their rotors turn several times faster than the bearing indicators of the Hartig machine. For example, if no echoes occurred for angular bearing deviations greater than 12°, gear ratios as high as 8 or 10 could be used. However, each transformer 165 and 166 should be driven by the same gear ratio as the other, and the gear ratios must have integral values such as four-to-one, or five-to-one. The two transformers 165 and 166 must, of course, be so adjusted that zero voltage appears across the output terminals of winding 178 when the two dials 161 and 163 indicate the same bearing.

In Fig. 2 an echo signal from lead 154 of Fig. 4 is applied at terminal 110, passed through attenuator 111, and amplified in tube V107A. The output of this tube V107A is transmitted equally to the control grids of amplifying tubes V105 and V106, the outputs of which are rectified at V104A and V104B respectively. Tubes V105 and V106 are of the variable-mu, or super control, type so that the degree of amplification given to the signal by each tube depends on the value of bias voltage applied to its control grid. The biases of these two tubes are controlled by a bearing circuit to be described presently, the effect of which is to bias the two tubes equally for indicating no deviation, and to give a greater bias to one tube for indicating a deviation in one direction, and to the other for indicating a deviation in the opposite direction.

The anodes of the tubes V105 and V106 are connected to the positive plate source through the plate load resistors R19 and R18 respectively, and coupling condensers C4 and C3 respectively are connected to the anodes to provide output voltages therefrom. The output voltages are connected to the "−250 v." terminal through resistances R16 and R17 respectively and the alternating current output voltages appear across these resistors. The voltage across the resistor R16 is taken off through a diode rectifier tube V104A having its plate connected to the junction of C4 and R16 and produces a current through the resistors R15, R13, and R32 which tends to raise the potential of the control grid of tube V103, while the voltage across the resistor R17 is taken off through a diode rectifier V104B which is oppositely poled with respect to V104A and produces a voltage through the resistances R14, R13, and R32 which tends to lower the potential on the control grid of tube V103. Since the resistor R32 is paralleled by the condenser C12, the potential applied to the grid of tube V103 is proportional to the algebraic sum of the voltages appearing across the resistances R16 and R17. If the amplification factors of the tubes V105 and V106 are equal, the net voltage on the condenser C12 is equal to zero and the tube V103 is biased by the voltage appearing across its cathode resistor R9 alone.

As previously stated, the tubes V105 and V106 are of the variable-mu type whose amplification factor may be varied by changing the grid bias applied thereto. If the grid bias of tube V105 is reduced relative to the grid bias of tube V106, the voltage produced in resistor R32 by tube V105 becomes larger than the voltage produced by tube V106, and the potential on the control grid of tube V103 is correspondingly raised to increase the current flow through the tube V103. If however, the bias on tube V106 is increased relative to the bias on tube V105, the potential on the control grid of tube V103 is correspondingly reduced to reduce the current flow therethrough. It will be apparent that an increase in the amplication factor of one tube relative to the other produces current changes in opposite senses, depending upon which tube has the greater amplification factor.

The cathode resistor R9 of tube V103 is not by-passed to increase the linearity of its amplification. The output voltage of tube V103 is provided with a filter consisting of the resistor R10 and C2 and produces an output voltage which is proportional to the difference between the voltage envelopes produced across the resistors R16 and R17. The output voltage from V103 is impressed on the tube V102 which operates as a cathode follower and controls the current delivered to the deflection coils 114 of the cathode ray oscilloscope tube V111.

The echo signal applied at terminal 110 will last for perhaps 50 milliseconds and recur not oftener than once every second. This echo will have a frequency near 800 cycles per second and this frequency will appear all through the circuit up to and including tube V103, but will be filtered out by resistor R10 and condenser C2 so that a pulse like the envelope of the echo will be applied to deflecting coils 114 of the oscilloscope tube. Accordingly when an echo signal occurs, it will produce no current in the deflecting coil 114 if equal bias voltages are applied to the tubes V105 and V106, but will produce a deflecting current in coil 114 if the bias voltages are unequal at tubes V105 and V106, and the direction of the deflection will depend on which tube has the greater bias.

The keying pulse produced periodically by the momentary closing of switch 130 of the Hartig machine (see Fig. 3) and transmitted by tube 134 of the adapter of Fig. 3 is applied to terminals 120 of Fig. 2 to momentarily energize relay K301 and close its contacts to discharge whichever condenser of the Group C1 is connected in the circuit. Immediately upon the reopening of the relay contacts at the end of the keying pulse, this condenser begins to recharge and as it does so, it raises the voltage applied to the control grid of tube V101 to gradually increase the current through sweep coil 115 of the cathode-ray tube. The charging resistors P1 and R5 through which the condenser C1 receives its charging current have such high values that the charging process takes place slowly. The various condensers of the group C1 have different capacities to provide various periods ranging from 1¼ to 6¼ seconds, and are selected by the "Range" control shown in Fig. 1. When this device is used with the Hartig machine, the keying pulse occurs at the time of the simulated transmission of the sound pulse and the echo signal simulates the reception of an echo of that sound transmission returned by an underwater object such as a submarine. The operation of the relay K301 initiates the slow sweeping motion of the light spot from bottom to top of the cathode ray screen. The echo signal occurs before the sweep is completed and any deflection, to the right or left, produced by the echo signal will appear as a small rectangular pip.

In actual underwater sound equipment, immediately after a sound pulse is transmitted, a series of echoes begins coming back from the water itself. These echoes, which immediately follow the transmission and have a very jumbled character, are called reverberations. For the purpose of realism, this sound effect is built into the Hartig machine, and since on actual sea-going equipment this effect produces deflections of the indicating spot of the cathode ray screen, it is desirable again for the sake of realism to reproduce this effect in the present invention. For this purpose the reverberation signal from the Hartig machine is taken from lead 155 of Fig. 4 and applied to terminals 122, attenuated at 123 and amplified at tube V107B. The output of this tube is rectified at V108A and filtered to recover only those frequency components in the neighborhood of 30 cycles per second and the resulting signal is applied to the control grid of tube V103 previously described.

It is also desirable in an indicator of this type to brighten the moving light spot whenever a deflection is applied to it, partly to make the deflections more noticeable and partly to compensate for the dimming effect of the rapid movement of the spot when a deflection occurs. To this end both reverberation and echo signals (from terminals 110 and 122) are applied to the control grid of amplifying tube V109. The output of this amplifier is rectified at V109B, filtered to remove high frequency components, and applied to the first grid of the cathode ray tube V111. Rectifying tube V108B acts as a limiter for by-passing any brightening signals that exceed a predetermined value, which signal value is set by the value of resistor R40.

The bearing indications are received from the rotor winding 178 of the transformer 166 of the adapted of Fig. 5 in the form of a continuous alternating current voltage whose magnitude is proportional to the value of bearing deviation and whose polarity (or phase with respect to the A. C. power line) is determined by the direction of the deviation, that is, right or left. This voltage is applied through terminals 180 to the control grids of the two amplifying tubes V110A and V110B. Applied to the cathodes of these two tubes are A. C. voltages, both taken from the power line but having opposite phases with respect to each other. Therefore, any signal voltage from transformer 166 will have the same phase as the voltage applied to the cathode of one of the two tubes V110A and V110B and will have a phase opposite to that of the voltage applied to the other. Consequently, the grid and plate voltages of one tube will combine to produce a strong signal and those of the other a weak signal. The outputs of these two tubes are filtered and applied as bias voltages to the control grids of the supercontrol tubes V105 and V106 already described. If the bearing voltage is zero, the outputs V110A and V110B will be equal and will apply equal bias voltages to tubes 105 and 106 so as to produce no deflection of the cathode ray spot as a result of the echo signal. Any bearing voltage (which will exist only in the case of a bearing deflection) will cause the two tubes V110A and V110B to apply unequal bias voltages to the control grids of tubes V105 and V106 so that the echo signal will cause a deflection of the light spot on the cathode ray tube.

To initially adjust the system for zero deflection of the cathode-ray spot, the input terminals 180 are short circuited, the system is put into operation, and the bearings of the search dial are adjusted to make echoes come through. Potentiometer P4 between the cathodes of V105 and V106 is then adjusted to eliminate any lateral deflection of the cathode ray trace. The short circuit at terminals 180 is removed and transformer winding 178 is connected with whichever polarity provides the desired direction of lateral deflections of the cathode ray trace.

Figure 6:
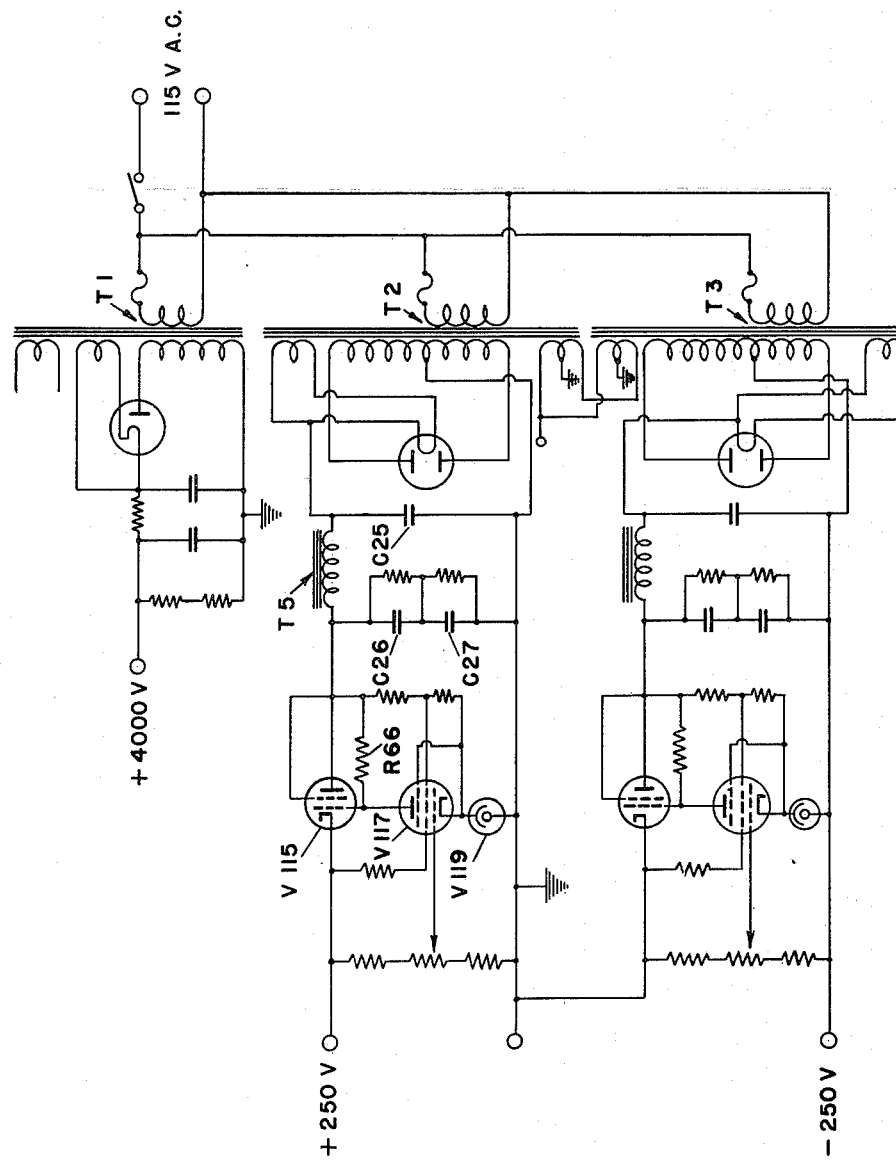
Fig. 6 is a schematic circuit diagram of a power supply suitable for serving the device of Fig. 2.

Fig. 6 illustrates a power supply for operating the circuits of Fig. 2. Transformer T1 drives a conventional half-wave thermionic rectifier and capacitor-resistor filter for delivery of 4000 volts to the accelerating electrodes of cathode ray tube V111.

Transformer T2 drives a conventional full wave rectifier with filter circuit consisting of condenser C25, C26 and C27 and choke T5. The output of this filter is then controlled by a voltage regulator which operates as follows. Voltage control tube V119 holds the cathode of amplifying tube V117 at a substantially constant voltage with respect to the ground terminal. The grid of this tube is connected to a voltage divider across the output terminals so that the control voltage applied to tube V117 varies with input voltage. Resistor R66 constitutes the load of tube V117 and the voltage across this load is impressed between the plate and the control grid of tube V115. Accordingly, should the output voltage drop slightly the cathode to grid voltage of tube V119 drops to reduce the current passed by tube V117, thereby reducing the voltage across R66. This action, since it tends to decrease the grid to plate voltage of tube V115, reduces the cathode to grid voltage so as to increase the conductivity of tube V115 to tend to increase the voltage across the output terminals.

The transformer T3 operates a second power supply similar to that operated by transformer T2. Their outputs are connected in series to provide voltages 250 volts above ground and 250 volts below ground.

Obviously many modifications and variations of the present invention are possible in the light of the above teachings. It is therefore to be understood that within the scope of the appended claims the invention may be practiced otherwise than as specifically described.

We claim:

1. In an indicating device of the class described, in combination, two similar amplifiers, means for imposing the same input signal on both amplifiers, means for varying the gain of at least one of them, circuit means for generating a signal of positive polarity from the output of one of said amplifiers and a signal of negative polarity from the output of the other, circuit means for combining said signals of positive and negative polarities and for developing a difference-signal therefrom, a cathode-ray oscilloscope tube, and means for controlling the illuminated spot thereof and for imposing opposite deflections thereon in response to positive and negative polarities of said difference-signal.

2. In an indicating device of the class described, in combination, two super-control amplifying tubes, means for imposing the same input signal on the control grids of both said tubes, means for varying the bias voltage on said control grid of at least one of said tubes for varying its gain, circuit means for rectifying the A. C. component of the output of each of said tubes and for combining the rectified voltages in opposition to each other, whereby to develop a difference-voltage the polarity and magnitude of which depend on the relative gains of said two amplifying tubes, a cathode-ray oscillograph tube, and means for controlling the illuminated spot thereof and for imposing opposite deflections thereon in response to positive and negative polarities of said difference voltage.

3. In an indicating device of the class described, in combination, a pair of control amplifiers, means for imposing thereon a first pair of control voltages consisting of A. C. voltages having approximately the same phase, and having magnitudes that maintain a substantially constant ratio, means for imposing thereon also a second pair of control voltages consisting of A. C. voltages having approximately opposite phases and having magnitudes that maintain a substantially constant ratio, two similar variable-gain amplifiers, separate circuit means for developing a bias voltage from the output of each of said control amplifiers and for imposing it on one of said variable-gain amplifiers to control the gain thereof, whereby the gains of said variable-gain amplifiers, relative to each other, vary with the relative phases of said two pairs of control voltages.

4. In an instructional device of the class described having means for simulating the manual controls and the visual bearing indicator of echo ranging gear, means including a pair of mechanical elements movable with the supposed target and projector bearings respectively, means for generating simulations of reverberation sounds, keying means for initiating such sounds, means for producing simulations of echoes from a target, and means responsive to the relative positions of said two mechanical elements for controlling the production of said echoes, the combination therewith of a cathode-ray oscilloscope tube, means responsive to said keying means for initiating a sweep of the light-spot of said tube, a deflection circuit for controlling the deflection of said light spot laterally of the direction of the sweep, a reverberation responsive circuit including a filter for passing a band of subsonic frequencies to said deflection circuit but substantially excluding other reverberation frequencies, an echo circuit comprising two variable gain amplifiers each responsive to the echo signal, means for rectifying the outputs of said amplifiers and for combining them in opposition and for imposing the resulting difference-signal on said deflection circuit, and means responsive to the relative positions of said two mechanical elements for producing a pair of gain control voltages for so controlling the gains of said amplifiers that opposite deviations from the supposed on-target position of said elements control said amplifiers of said echo circuit to produce opposite deflections of the light-spot of said oscilloscope tube.

GEORGE A. BRETTELL, JR.
CLARK F. BRADLEY.

No references cited.